US008099281B2

(12) United States Patent
Gleason

(10) Patent No.: US 8,099,281 B2
(45) Date of Patent: Jan. 17, 2012

(54) SYSTEM AND METHOD FOR WORD-SENSE DISAMBIGUATION BY RECURSIVE PARTITIONING

(75) Inventor: Philip Gleason, Boca Raton, FL (US)

(73) Assignee: Nunance Communications, Inc., Burlington, MA (US)

( * ) Notice: Subject to any disclaimer, the term of this patent is extended or adjusted under 35 U.S.C. 154(b) by 980 days.

(21) Appl. No.: 11/145,656

(22) Filed: Jun. 6, 2005

(65) Prior Publication Data

US 2006/0277045 A1 Dec. 7, 2006

(51) Int. Cl.
*G01L 13/08* (2006.01)
*G01L 13/06* (2006.01)
*G06F 17/28* (2006.01)
*G06F 17/27* (2006.01)

(52) U.S. Cl. ................. 704/260; 704/2; 704/9; 704/266

(58) Field of Classification Search .................. 704/260, 704/266, 267

See application file for complete search history.

(56) References Cited

U.S. PATENT DOCUMENTS

| | | | | |
|---|---|---|---|---|
| 4,868,750 A | | 9/1989 | Kucera et al. | |
| 5,317,507 A | * | 5/1994 | Gallant | 715/260 |
| 5,477,451 A | * | 12/1995 | Brown et al. | 704/9 |
| 5,541,836 A | * | 7/1996 | Church et al. | 704/7 |
| 5,768,603 A | * | 6/1998 | Brown et al. | 704/9 |
| 5,805,832 A | * | 9/1998 | Brown et al. | 711/1 |
| 6,098,042 A | * | 8/2000 | Huynh | 704/260 |
| 6,304,841 B1 | * | 10/2001 | Berger et al. | 704/2 |
| 6,347,298 B2 | | 2/2002 | Vitale et al. | |
| 6,363,342 B2 | * | 3/2002 | Shaw et al. | 704/220 |
| 6,519,580 B1 | * | 2/2003 | Johnson et al. | 706/47 |
| 6,684,201 B1 | * | 1/2004 | Brill | 706/45 |
| 6,711,541 B1 | * | 3/2004 | Kuhn et al. | 704/242 |
| 6,889,219 B2 | * | 5/2005 | Epstein et al. | 706/45 |
| 7,272,612 B2 | * | 9/2007 | Birdwell et al. | 1/1 |
| 7,475,010 B2 | * | 1/2009 | Chao | 704/10 |
| 2004/0024584 A1 | * | 2/2004 | Brill | 704/9 |

OTHER PUBLICATIONS

Yarowsky, "Homograph Disambiguation in Text-to-Speech Synthesis",1997, Springer-Verlag, pp. 159-175.*
Yarowsky, "One Sense Per Collocation" 1993, ARPA, pp. 266-271.*
Gale et al, " A Method for Disambiguating Word Senses in a Large corpus", 1993, Kluwer Publishers, pp. 415-439.*
Benitez et al, " Semantic Knowledge Construction From Annotated Image Collections", 2002, IEEE, pp. 205-208.*

(Continued)

*Primary Examiner* — Richemond Dorvil
*Assistant Examiner* — Olujimi Adesanya
(74) *Attorney, Agent, or Firm* — Wolf, Greenfield & Sacks, P.C.

(57) ABSTRACT

A device and related methods for word-sense disambiguation during a text-to-speech conversion are provided. The device, for use with a computer-based system capable of converting text data to synthesized speech, includes an identification module for identifying a homograph contained in the text data. The device also includes an assignment module for assigning a pronunciation to the homograph using a statistical test constructed from a recursive partitioning of training samples, each training sample being a word string containing the homograph. The recursive partitioning is based on determining for each training sample an order and a distance of each word indicator relative to the homograph in the training sample. An absence of one of the word indicators in a training sample is treated as equivalent to the absent word indicator being more than a predefined distance from the homograph.

24 Claims, 4 Drawing Sheets

OTHER PUBLICATIONS

Panchapagesan et al, "Hindi Text Normalization", Dec. 2004, Fifth International Conference on Knowledge Based Computer Systems, pp. 1-10.*
Siegel et al "Emergent Linguistic Rules from Inducing Decision Trees: Disambiguating Discourse Clue Words" 1994, Proc. of the 12th National Conf. on Artificial Intelligence, vol. 1, pp. 820-826.*
Crestan et al "Contextual Semantics for WSD", Association for Computational Linguistics for the Semantic Analysis of Text, Barcelona, Spain, Jul. 2004, pp. 1-4.*
Siegel et al, "Emergent linguistic rules from inducing decision trees: Disambiguating discourse clue words", 1994, In Proceedings of the Twelfth National Conference on Artificial Intelligence (AAAI-94), vol. 1, pp. 820-826.*
Crestan et al, "Improving Supervised WSD by Including Rough Semantic Features in aMulti-Level View of the Context", 2001, SEMPRO Workshop, Edinburgh, pp. 1-6.*
Siciliano et al, "Multivariate data analysis and modeling through classification and regression trees", 2000, Computational Statistics & Data Analysis, 32, pp. 285-301.*
De Montcheuil et al, "Using a Word Sense Disambiguation system for Translation Disambiguation: The LIA-LIDILEM team experiment", Jul. 2004, SENSEVAL-3, pp. 1-4.*

* cited by examiner

SYSTEM AND METHOD FOR WORD-SENSE DISAMBIGUATION BY RECURSIVE PARTITIONING

FIELD OF THE INVENTION

The present invention is related to the field of pattern analysis, and more particularly, to pattern analysis involving the conversion text data to synthetic speech.

BACKGROUND OF THE INVENTION

Numerous advances, both with respect to hardware and software, have been made in recent years relating to computer-based speech recognition and to the conversion of text into electronically generated synthetic speech. Thus, there now exist computer-based systems in which data that is to be synthesized is stored as text in a binary format so that as needed the text can be electronically converted into speech in accordance with a text-to-speech conversion protocol. One advantage of this is that it reduces the memory overhead that would otherwise be needed to store "digitized" speech.

Notwithstanding these advances, however, one problem persists in transforming textual input into intelligible human speech, namely, the handling of homographs that are sometimes encountered in any textual input. A homograph comprises one or more words that have identical spellings but different meanings and different pronunciations. For example, the word BASS has two different meanings—one pertaining to a type of fish and the other to a type of musical instrument. The word also has two distinct pronunciations. Such a word obviously presents a problem for any text-to-speech engine that must predict the phonemes that correspond to the character string B-A-S-S.

In some instances, the meaning and pronunciation may be dictated by the function that the homograph performs; that is, the part of speech to which the word corresponds. For example, the homograph CONTRACT, when it functions as a verb has one meaning—and, accordingly, one pronunciation—and another meaning and corresponding pronunciation when it functions as a noun. Therefore, since nouns frequently precede predicates, knowing the order of appearance of the homograph in a word string may give a clue as to its appropriate pronunciation. In other instances, however, homographs function as the same parts of speech, and accordingly, word order may not be helpful in determining a correct pronunciation. The word BASS is one such homograph: whether as a fish or a musical instrument, it functions as a noun.

In contexts other than word recognition, one method of pattern classification that has been successfully utilized is recursive partitioning. Recursive partitioning is a method that, using a plurality of training samples, tests parameter values to determine a parameter and value that best separate data into categories. The testing uses an objective function to measure a degree of separation effected by partitioning the training sample into different categories. Once an initial partitioning test has been found, the algorithm is recursively applied on each of the two subsets generated by the partitioning. The partitioning continues until either a subset comprising one unadulterated, or pure, category is obtained or a stopping criterion is satisfied. On the basis of this recursive partitioning and iterative testing, a decision tree results which specifies tests and sub-tests that can jointly categorize different data elements.

Although recursive partitioning has been widely applied in other contexts, the technique is not immediately applicable to the disambiguation of homographs owing to the large amounts of missing data that typically occur. Thus, there remains in the art a need for an effective and efficient technique for implementing a recursive partitioning in the context of disambiguating homographs during a text-to-speech conversion. Specifically, there is a need for a technique to recursively partition a training set to construct a statistical test, in the form of a decision tree, that can determine with a satisfactory level of accuracy the pronunciations of homographs that may occur during a text-to-speech event.

SUMMARY OF THE INVENTION

The invention, according to one embodiment, provides a device that can be used with a computer-based system capable of converting text data to synthesized speech. The device can include an identification module for identifying a homograph contained in the text data. The device also can include an assignment module for assigning a pronunciation to the homograph using a statistical test constructed from a recursive partitioning of a plurality of training samples.

Each training sample can comprise a word string that contains the homograph. The recursive partitioning can be based on determining for each of a plurality of word indicators an order and a distance of each word indicator relative to the homograph in each training sample. Moreover, an absence of one of the plurality of word indicators in a training sample can be treated as equivalent to the absent word indicator being more than a predefined distance from the homograph.

Another embodiment of the invention is a method of electronically disambiguating homographs during a computer-based text-to-speech event. The method can include identifying a homograph contained in a text, and determining a pronunciation for the homograph using a statistical test constructed from a recursive partitioning of a plurality of training samples. Each training sample, again, can comprise a word string containing the homograph. Likewise, the recursive partitioning can be based on determining for each of a plurality of word indicators an order and a distance of each word indicator relative to the homograph in each training sample, with an absence of one of the plurality of word indicators in a particular training sample being treated as equivalent to the absent word indicator being more than a predefined distance from the homograph.

Still another embodiment of the invention is a computer-implemented method of constructing a statistical test for determining a pronunciation of a homograph encountered during an electronic text-to-speech conversion event. The method can include selecting a set of training samples, each training sample comprising a word string containing the homograph. The method further can include recursively partitioning the set of training samples, the recursive partitioning producing a decision tree for determining the pronunciation and being based on determining for each of a plurality of word indicators an order and a distance of each word indicator relative to the homograph in each training sample. The absence of one of the plurality of word indicators in a training sample can be treated as equivalent to the absent word indicator being more than a predefined distance from the homograph

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION

Figure 1:
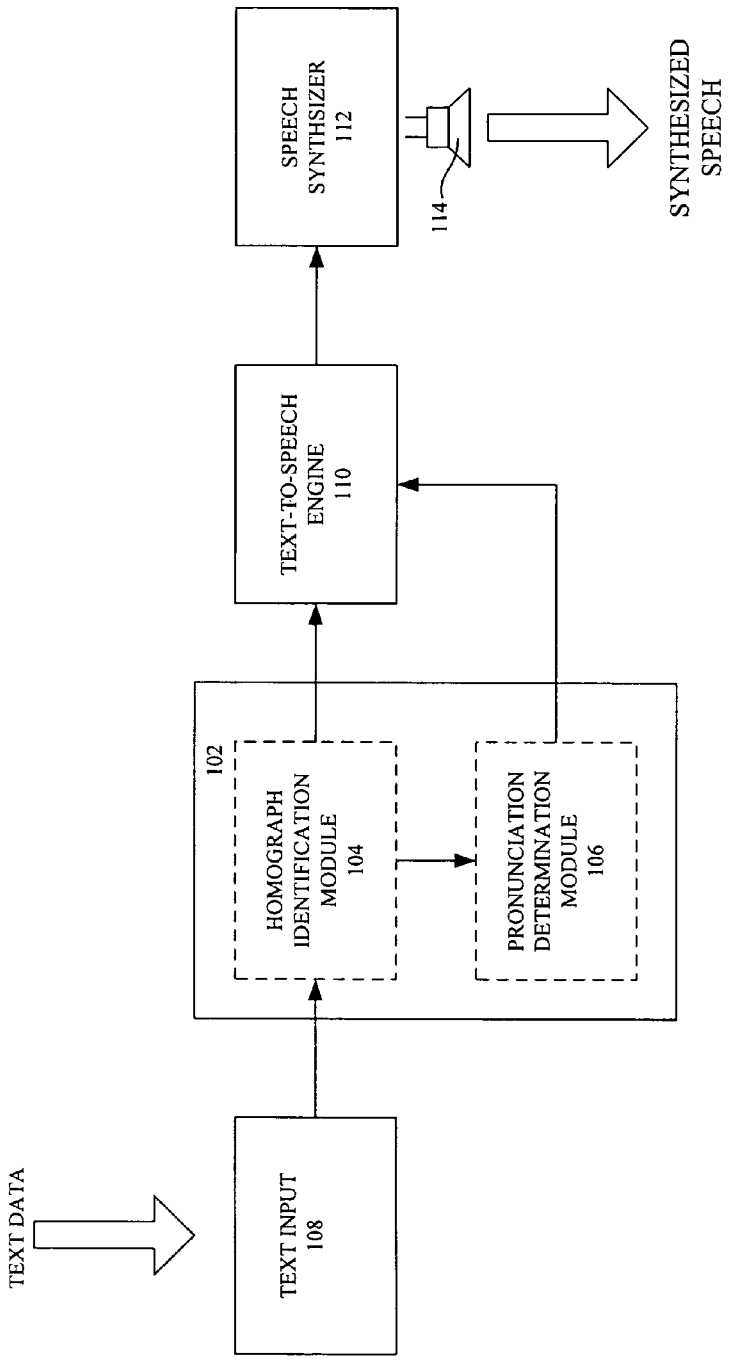
FIG. 1 is schematic diagram of a computer-based system having a text-to-speech conversion capability and a device for determining a pronunciation of homographs occurring in text data, according to one embodiment of the invention.

FIG. 1 is schematic diagram of a computer-based system 100 having a text-to-speech conversion capability and, according to one embodiment of the invention, a device 102 for determining a pronunciation of each homograph occurring in text data. The device 102 illustratively comprises an identification module 104 and an assignment module 106 in communication with one another.

One or both of the identification module 102 and assignment module 104 can be implemented in one or more dedicated, hardwired circuits. Alternatively, one or both of the modules can be implemented in machine-readable code configured to run on a general-purpose or application-specific computing device. According to still another embodiment, one or both of the modules can be implemented in a combination of hardwired circuitry and machine-readable code. The functions of each module are described herein.

Illustratively, the system 100 also includes an input device 108 for receiving text data and a text-to-speech engine 110 for converting the text data into speech-generating data. The device 102 for handling homographs is illustratively interposed between the input device 108 and the text-to-speech engine 110. The system 100 also illustratively includes a speech synthesizer 112 and a speaker 114 for generating an audible rendering based on the output of the text-to-speech engine 110.

The computer-based system 100 can comprise other components (not shown) common to a general-purpose or application-specific computing device. The additional components can include one or more processors, a memory, and a bus, the bus connecting the one or more processors with the memory. The computer-based system 100, alternatively, can include various data communications network components that include a text-to-speech conversion capability.

Operatively the device 102 determines a pronunciation for each homograph encountered in text data that is supplied to the computer-based system 100 and that is to undergo a conversion to synthetic speech. When text data is received at the input device 108, the text data is initially conveyed to the identification module 104 of the device 102. The identification module 104 determines whether the text data conveyed from the input device 108 contains a homograph, and if so, identifies the particular homograph. The identification module 104, accordingly, can include a set that is formatted, for example, as a list of predetermined homographs. The set of homographs contained in the identification module need not be inordinately large: the English language, for example, contains approximately 500 homographs. The text data can be examined by the identification module 104 to determine a match between any word in the text and one of the members of the stored set of homographs.

Once identified by the identification module 104, the homograph (or, more particularly, a representation in the form of machine-readable code) is conveyed from the identification module to the assignment module 106, which, according to the operations described herein, assigns a pronunciation to the homograph. The pronunciation that is assigned to, or otherwise associated with, the homograph by the assignment module 106 is illustratively conveyed from the assignment module to the text-to-speech engine 110. The pronunciation so determined allows the text-to-speech engine 110 to direct the synthesizer 112 to render the homograph according to the pronunciation determined by the device 102.

The assignment module 106 assigns a pronunciation to the homograph using a statistical test, in the form of a decision tree. The decision tree determines which among a set of alternative pronunciations is most likely the correct pronunciation of a homograph. As explained herein, the statistical test that is employed by the assignment module 106 is constructed through a recursive partitioning of a plurality of training samples, each training sample comprising a word string containing a particular homograph. A word string can be, for example, a sentence demarcated by standard punctuation symbols such as a period or semi-colon. Alternatively, the word string can comprise a predetermined number of words appearing in a discrete portion of text, the homograph appearing in one word position within the word string.

The recursive partitioning of the plurality of training samples is based on word indicators associated with each homograph. A word indicator, as defined herein, is a word that can be expected to occur with some degree of regularity in word strings containing a particular homograph. For example, word indicators associated with the word BASS can include WIDE-MOUTH, DRUM, and ANGLER. As with most homographs, there likely are a number of other word indicators that are associated with the word BASS. Without loss of generality, though, the construction of the statistical test can be adequately described using only these three exemplary word indicators.

Figure 2:
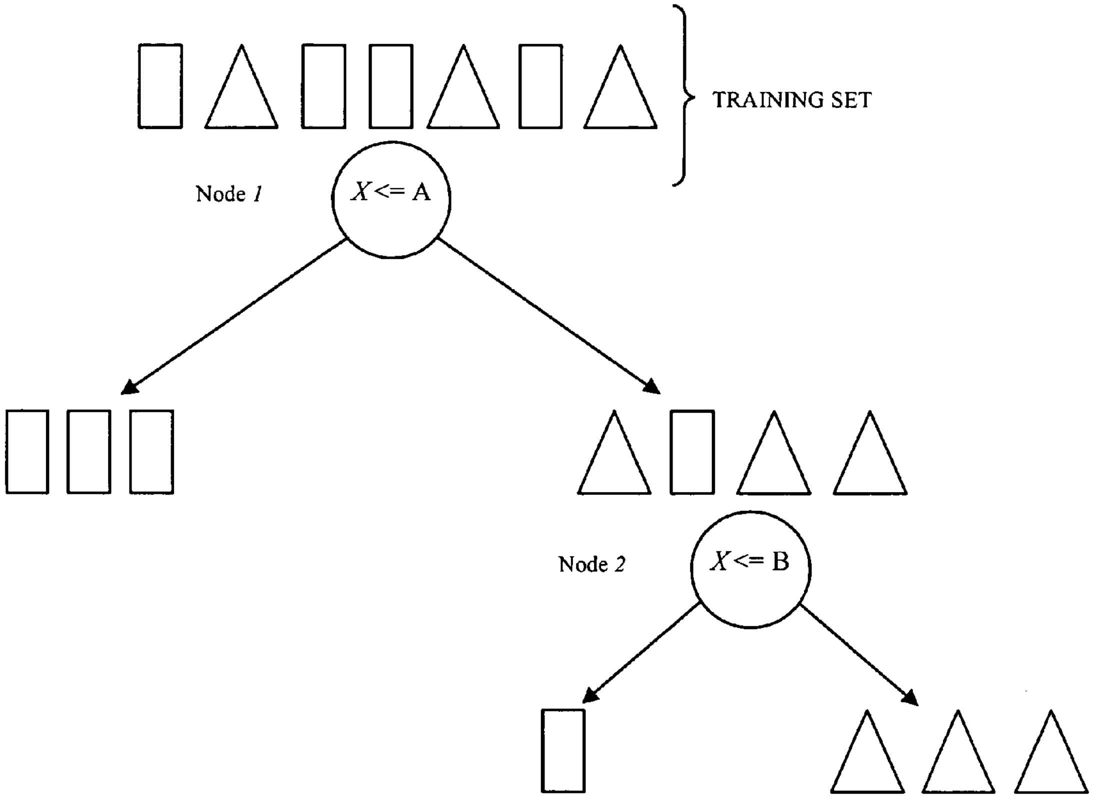
FIG. 2 is a schematic diagram of a recursive partitioning used to construct a decision tree, according to another embodiment of the invention.

The recursive partitioning, as the phrase suggests, successively splits a set of training samples into ever smaller, or more refined, subsets. FIG. 2 schematically illustrates the recursive partitioning of a set of training samples. Each split is made on the basis of a query as to whether or not a decision rule or function, $f(\theta)$, is TRUE or FALSE. Each $x_i$ of the matrix corresponds to the i-th feature of a training sample that is to be allocated to one or the other of two subsets of the set at the n-th node. As explained subsequently, the $x_i$ is a numerical indicator of the order and word position of a word indicator relative to the homograph of the training sample. The following example illustrates the procedure.

According to one embodiment, the set of training samples is culled from a large corpus of text that has been searched for sentences that contain a particular homograph. Each selected sentence is a word string that serves as a training sample. Each such sentence is labeled so as to indicate the correct pronunciation for the homograph contained in that sentence. The selected sentences are processed into a matrix form as illustrated by Table 1:

| Category | wide-mouth | drum | angler |
|---|---|---|---|
| Fish | −1 | NA | NA |
| Fish | NA | NA | 10 |

-continued

| Category | wide-mouth | drum | angler |
|---|---|---|---|
| Music | NA | 1 | NA |
| Music | NA | −12 | NA |

The first column is a label that identifies the homograph's pronunciation: FISH if the homograph is to be pronounced as B-A-S-S, and MUSIC if the homograph is to be pronounced as B-A-S-E. Each subsequent column corresponds to a particular word indicator. Each row comprises a training sample, and each column comprises a feature of a training sample. Thus, each element of the matrix is the value of the feature, $x_i$, i=1, 2, 3, $x_i \in N$, for a particular training sample. Each feature corresponds to a particular word indicator. The integer value of each feature indicates the order and word position of the particular indicator word relative to the homograph. A negative integer indicates that the word indicator occurs to the left of the homograph, and a positive integer indicates that the word indicator occurs to the right. The absolute value of the integer indicates the word position of the indicator word relative to the homograph.

For example, the first training sample corresponds to the first row of the matrix. The correct pronunciation of the homograph is B-A-S-S (i.e., the training sample is labeled FISH). Neither of the word indicators DRUM or ANGLER occur in the first training sample, but the indicator word WIDE-MOUTH is one word to the left of the homograph as indicated by the negative integer, −1, at the intersection of the first row and second column of the exemplary matrix.

When a particular indicator word associated with the homograph is absent from the word string comprising a training sample, the absence of the indicator word is indicated by NA in the corresponding cell of the matrix. The specific manner in which absent indicator words are treated is described below.

Each splitting of a set or subset of the training samples corresponds to a node of the decision tree that is constructed through recursive partitioning. Splitting results in a refinement of one set (if the node is the first node) or one subset into a smaller or refined pair of subsets as illustrated in FIG. 2. The particular partitioning that results from recursive partitioning depends on the decision rule or function applied at each node. The choice of a decision rule or function is driven by a fundamental principle underlying tree creation, namely, that compact trees with few nodes are preferred. This is simply an application of Occam's razor, which holds that the simplest model that adequately explains the underlying data is the one that is preferred. To satisfy this criteria, the decision function or rule is selected so as to increase the likelihood that a partition of the training sample at each immediate descendent node is as "pure" as possible.

In formalizing this notion, it is generally more convenient to define the impurity of a node rather than its purity. The criteria for an adequate definition is that the impurity of node n, denoted here as i(n), is zero if all the data samples that fall within a subset following a split at the n-th node bear the same label (e.g., either FISH or MUSIC). Conversely, i(n) is maximum if the different labels are exactly equally represented by the data samples within the subset (i.e., the number labeled FISH equals the number labeled MUSIC). If one label predominates, then the value of i(n) is between zero and its maximum.

One measure of impurity that satisfies the stated criteria is entropy impurity, sometimes referred to as Shannon's impurity or information impurity. The measure is defined by the following summation equation:

$$i(n) = -\sum_j P(\omega_j)\log_2 P(\omega_j),$$

where $P(\omega_j)$ is the fraction of data samples at node n that are in category $\omega_j$. As readily understood by one of ordinary skill in the art, the established properties of entropy ensure that if all the data samples have the same label, or equivalently, fall within the same category (e.g., FISH or MUSIC), then the impurity entropy is zero; otherwise it is positive, with the greatest value occurring when any two data samples having a different labels are equally likely.

Another measure of impurity is the Gini impurity, defined by the following alternate summation equation:

$$i(n) = \sum_{i \neq j} P(\omega_j)P(\omega_j) = \frac{1}{2}\left[1 - \sum_j P^2(\omega_j)\right].$$

The Gini impurity can be interpreted as a variance impurity since under certain relatively benign assumptions, it is related to the variance of a probability distribution associated with the two categories, i and j. The Gini impurity is simply the expected error rate at the n-th node if the label is selected randomly from the class distribution at node n.

Still another measure is the misclassification impurity, which is defined as follows:

$$i(n) = 1 - \max_j P(\omega_j).$$

The misclassification impurity measures the minimum probability that a training sample would be misclassified at the n-th node.

The decision rule applied at each node in constructing the decision tree implemented by the assignment module 106 can be selected according to any of these measures of impurity. As will be readily understood by one of ordinary skill, other measures of impurity that satisfy the stated criteria can alternatively be used.

According to one embodiment, the decision tree implement by the assignment module 106 effects a partitioning at a succession of nodes according to the following algorithm:

```
if (test_value<0) {
        if (datum != NA && datum > test_value && datum < 0)
succeed // if the datum is within a certain distance to the left of the
homograph put it in partition A
        else fail // put the datum in partition B
} else {
        if (datum != NA && datum < test_value && datum > 0)
succeed // if the datum is within a certain distance to the right of the
homograph put it in partition A
        else fail // put datum in partition B
```

In the algorithm, the text_value is a positive or negative integer depending, respectively, on whether the word position of the particular word indicator is to the right or to the left of the homograph for which the decision tree is being constructed. The datum can be the value of a cell at the intersection of a row and a column of a matrix, when, as described above, each of the training samples is formatted as a row vector and each column of the matrix corresponds to a predetermined indicator word associated for the particular homograph.

Different partitions and, accordingly, different decision trees are constructed by choosing different decision functions or rules. The decision functions or rules are evaluated at each node on the basis of the entropy impurity or Gini impurity, described above, or a similar entropy measurement. On this basis, each of the various ways of splitting a given node is considered, consideration being given to each node individually. The particular split selected for a given node is the one that yields the "best score" in terms of the specific entropy measurement used. The intent is to select at each node the decision rule that is most the effective with respect to minimizing the measured entropy associated with the split at each node. The selection of the various splits or partitions results in the decision tree that is implemented by the assignment module 106.

A key aspect of the invention in constructing the decision tree is the manner in which missing values in a word string are treated. A missing value is the absence of a particular indicator word associated with the homograph that is contained in the word string. When an indicator word is absent from a word string comprising a training sample, the absent indicator word is categorized as a failure to satisfy the decision function or rule. For example, according to the above-delineated algorithm, an absent word indicator is treated as a word indicator whose order and word position fails to satisfy the decision rules implemented by the nested if-else statements.

The operative effect of treating missing values in the same manner as $x_i$ values that fail to satisfy a decision rule is to retain all of the labels of the missing values for evaluation by the entropy measure rather than simply discarding them. Accordingly, this technique rewards the proximity of an indicator word relative to the corresponding homograph. Indicator words absent from a word string comprising a training sample are treated as being at a large distance from the homograph. The invention thus avoids sacrificing the numerical benefits of having a large data set, as will be readily recognized by one of ordinary skill in the art.

Note that were missing data discarded, the entropy measure would be based on a small set of training samples (i.e., only those for which the particular word string contained the indicator word). Worse, the small set of training samples would change from one indicator word to another.

Another advantage of the invention pertains to testing separately for values less than zero and greater than zero. The effect of this treatment is to treat indicator words that appear in a word string to the left of a homograph independently of indicator words that appear to the right. In a conventional recursive partitioning algorithm, the typical decision rule is a simple inequality such as $x_i \leqq x_{iS}$, which in the context of the example above corresponds to testing whether the datum is greater than or less than the test_value; no account of order is taken as with the invention.

The effect of such failure to take account of word order is to put words that are one place to the left of a homograph in the same partition as words that are any distance to the right. Word order is important, however, since they are often dictated by rules of grammar—adjectives are to the left of the nouns they modify, for example—which determine what part of speech a word is. The parts of speech dictate how a word is used, and knowing how a word is used can provide critical information for determining what the word is.

Figure 3:
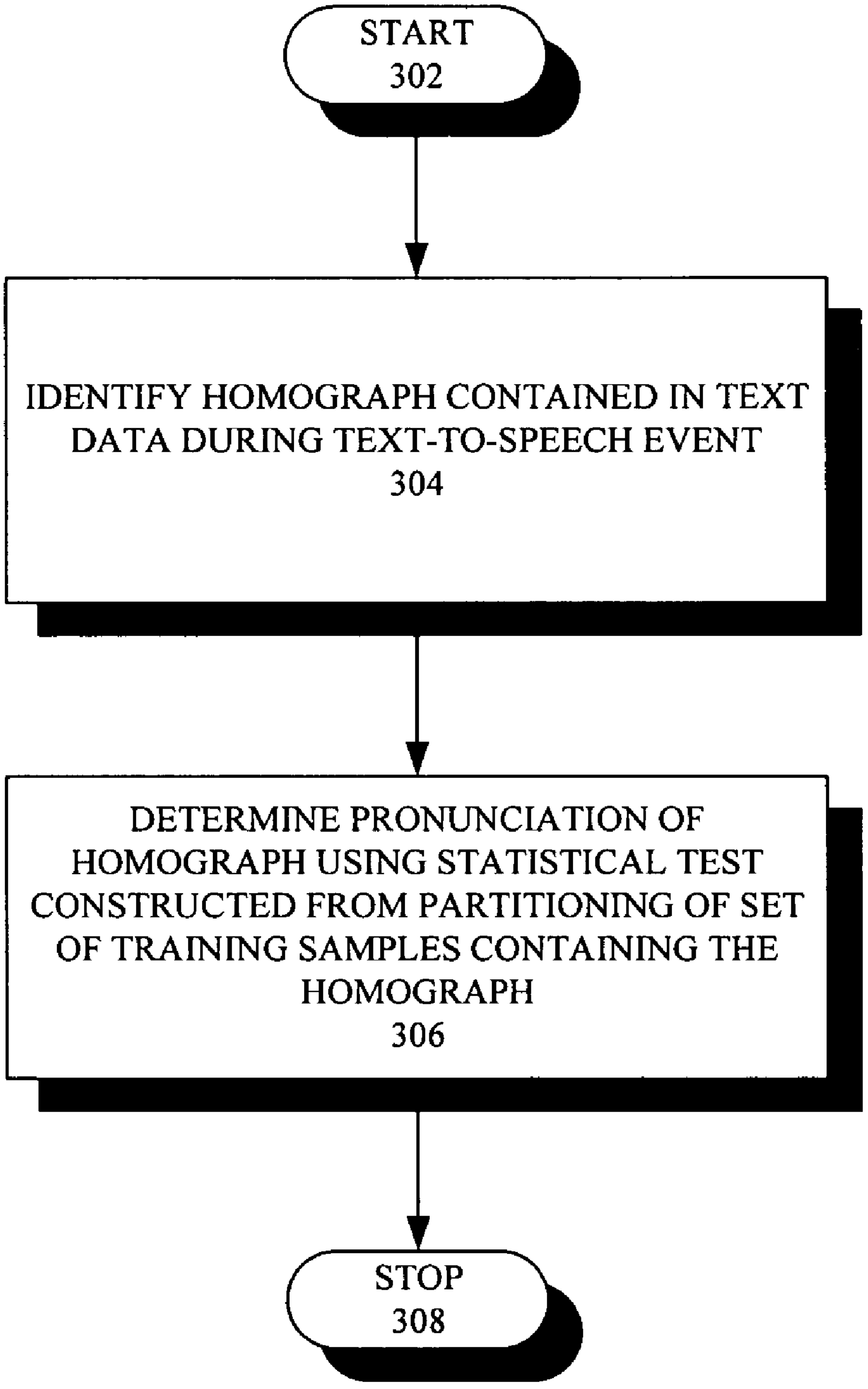
FIG. 3 is a flowchart illustrating the exemplary steps of a method for determining a pronunciation of a homograph occurring in text data, according to yet another embodiment of the invention.

FIG. 3 is flowchart of a method for computationally disambiguating homographs during a computer-based text-to-speech event. The method 300 illustratively begins at step 302. At step 304, the method 300 illustratively includes identifying a homograph contained in a text. Subsequently, at step 306 of the method 300, a pronunciation for the homograph is determined using a statistical test constructed from a recursive partitioning of a plurality of training samples. Each of the training samples, more particularly, comprises a word string containing the homograph.

The recursive partitioning through which the statistical test used in step 306 of the method 300 is constructed comprises determining for each of a plurality of word indicators an order and a distance of each word indicator relative to the homograph in each training sample. In constructing the statistical test, moreover, an absence of one of the plurality of word indicators in a training sample is treated as an equivalent to the absent word indicator being more than a predefined distance from the homograph. The method 300 concludes at step 308.

Figure 4:
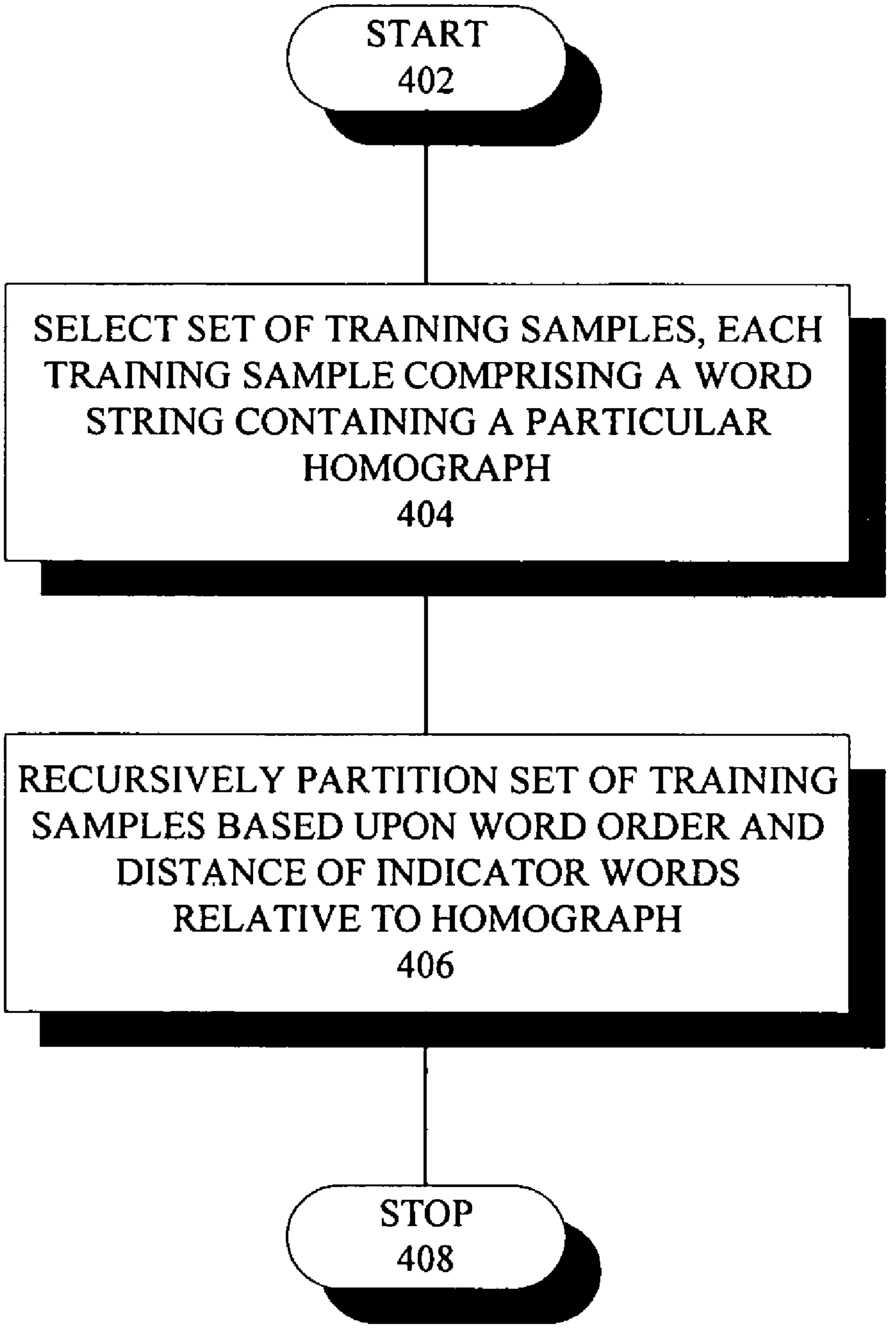
FIG. 4 is a flowchart illustrating the exemplary steps of a method for constructing a decision tree that statistically determines a pronunciation of a homograph during a text-to-speech event, according to still another embodiment of the invention.

FIG. 4 is a flowchart of a computer-implemented method of constructing a statistical test for determining a pronunciation of a homograph encountered during an electronic text-to-speech conversion event. The method 400 illustratively begins at step 402. At step 404, the method 400 illustratively includes selecting a set of training samples, each training sample comprising a word string containing the homograph.

The method 400 further includes recursively partitioning the set of training samples at step 406, the recursive partitioning producing a decision tree for determining the pronunciation. The recursive partitioning, more particularly can be based on determining for each of a plurality of word indicators an order and a distance of each word indicator relative to the homograph in each training sample. Moreover, an absence of one of the plurality of word indicators in a training sample is treated as an equivalent to the absent word indicator being more than a predefined distance from the homograph. The method 400 illustratively concludes at step 408.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

I claim:

1. A method of constructing a test for use in electronically disambiguating a homograph during a computer-based text-to-speech event, the method comprising:

using at least one processor to construct a decision tree for determining a pronunciation label for the homograph in an input word string, the decision tree comprising at least first and second nodes, the first node being a parent of the second node, wherein the at least one processor is configured to construct the decision tree at least in part by:

accessing a first set of training samples, each of the training samples comprising a word string that contains the homograph and a pronunciation label indicating a correct pronunciation of the homograph in the word string;

applying a plurality of decision rules to the first set of training samples, each of the plurality of decision rules partitioning the first set of training samples into at least two subsets of the first set of training samples;

for each one of the plurality of decision rules, computing a corresponding measure of impurity indicative of an extent to which each of the at least two subsets formed by applying the one of the plurality of decision rules contains training samples associated with different pronunciation labels, wherein the one of the plurality of decision rules, when applied to word strings in the first set of training samples, determines whether at least one selected word indicator is present in the word strings, and wherein at least one training sample in the first set of training samples is retained for computing the measure of impurity corresponding to the one of the plurality of decision rules even if the at least one selected word indicator is absent in the word string of the at least one training sample; and selecting, for the first node of the decision tree, a decision rule from the plurality of decision rules based at least in part on the measures of impurity computed for the plurality of decision rules.

2. The method of claim 1, wherein the at least one processor is further configured to apply the test to the input word string at least in part by:

at the first node of the decision tree, determining whether to proceed to the second node of the decision tree, at least in part by applying the selected decision rule to the input word string.

3. The method of claim 1, wherein the selected decision rule has a lowest measure of impurity among the plurality of decision rules.

4. The method of claim 1, wherein the measures of impurity comprise an entropy measure.

5. The method of claim 4, wherein the entropy measure comprises a Shannon entropy.

6. The method of claim 4, wherein the entropy measure comprises a Gini entropy.

7. The method of claim 1, wherein, when applied to word strings in the first set of training samples, the one of the plurality of decision rules determines an order and a distance of at least one selected word indicator relative to the homograph in each word string, wherein an absence of the at least one selected word indicator in at least one word string is treated as the at least one selected word indicator being more than a predefined distance from the homograph.

8. The method of claim 1, wherein the plurality of decision rules is a first plurality of decision rules and the selected decision rule is a first decision rule that partitions the first set of training samples into at least second and third sets of training samples, and wherein the at least one processor is further configured to construct the decision tree at least in part by:

applying a second plurality of decision rules to the second set of training samples, each of the second plurality of decision rules partitioning the second set of training samples into at least two subsets of the second set of training samples;

for each one of the second plurality of decision rules, computing a corresponding measure of impurity indicative of an extent to which each of the at least two subsets formed by applying the one of the second plurality of decision rules contains training samples associated with different pronunciation labels; and selecting, for the second node of the decision tree, a second decision rule from the second plurality of decision rules based at least in part on the measures of impurity computed for the second plurality of decision rules.

9. A system for constructing a test for use in electronically disambiguating a homograph during a computer-based text-to-speech event, the system comprising:

an input for receiving a plurality of training samples, each training sample comprising a word string containing the homograph and a pronunciation label indicating a correct pronunciation of the homograph in the word string; and at least one computer coupled to the input to receive the plurality of training samples, the at least one computer programmed to construct a decision tree for determining a pronunciation label for the homograph in an input word string, the decision tree comprising at least first and second nodes, the first node being a parent of the second node, wherein the at least one computer is programmed to construct the decision tree at least in part by:

accessing a first set of training samples, each of the training samples comprising a word string that contains the homograph and a pronunciation label indicating a correct pronunciation of the homograph in the word string;

applying a plurality of decision rules to the first set of training samples, each of the plurality of decision rules partitioning the first set of training samples into at least two subsets of the first set of training samples;

for each one of the plurality of decision rules, computing a corresponding measure of impurity indicative of an extent to which each of the at least two subsets formed by applying the one of the plurality of decision rules contains training samples associated with different pronunciation labels, wherein the one of the plurality of decision rules, when applied to word strings in the first set of training samples, determines whether at least one selected word indicator is present in the word strings, and wherein at least one training sample in the first set of training samples is retained for computing the measure of impurity corresponding to the one of the plurality of decision rules even if the at least one selected word indicator is absent in the word string of the at least one training sample; and selecting, for the first node of the decision tree, a decision rule from the plurality of decision rules based at least in part on the measures of impurity computed for the plurality of decision rules.

10. The system of claim 9, wherein the at least one computer is further programmed to apply the test to the input word string at least in part by:

at the first node of the decision tree, determining whether to proceed to the second node of the decision tree, at least in part by applying the selected decision rule to the input word string.

11. The system of claim 9, wherein the selected decision rule has a lowest measure of impurity among the plurality of decisions.

12. The system of claim 9, wherein the measures of impurity comprise an entropy measure.

13. The system of claim 12, wherein the entropy measure comprises a Shannon entropy.

14. The system of claim 12, wherein the entropy measure comprises a Gini entropy.

15. The system of claim 9, wherein, when applied to word strings in the first set of training samples, the one of the plurality of decision rules determines an order and a distance of at least one selected word indicator relative to the homograph in each word string, wherein an absence of the at least one selected word indicator in at least one word string is treated as the at least one selected word indicator being more than a predefined distance from the homograph.

16. The system of claim 9, wherein the plurality of decision rules is a first plurality of decision rules and the selected decision rule is a first decision rule that partitions the first set of training samples into at least second and third sets of training samples, and wherein the at least one computer is further programmed to construct the decision tree at least in part by:

applying a second plurality of decision rules to the second set of training samples, each of the second plurality of decision rules partitioning the second set of training samples into at least two subsets of the second set of training samples;

for each one of the second plurality of decision rules, computing a corresponding measure of impurity indicative of an extent to which each of the at least two subsets formed by applying the one of the second plurality of decision rules contains training samples associated with different pronunciation labels; and selecting, for the second node of the decision tree, a second decision rule from the second plurality of decision rules based at least in part on the measures of impurity computed for the second plurality of decision rules.

17. At least one machine readable memory, having stored thereon a computer program having a plurality of code sections executable by at least one machine for causing the at least one machine to perform a computer-implemented method for constructing a test for use in disambiguating a homograph during a computer-based text-to-speech event, the method comprising steps of:

using at least one processor to construct a decision tree for determining a pronunciation label for the homograph in an input word string, the decision tree comprising at least first and second nodes, the first node being a parent of the second node, wherein the at least one processor is configured to construct the decision tree at least in part by:

accessing a first set of training samples, each of the training samples comprising a word string that contains the homograph and a pronunciation label indicating a correct pronunciation of the homograph in the word string;

applying a plurality of decision rules to the first set of training samples, each of the plurality of decision rules partitioning the first set of training samples into at least two subsets of the first set of training samples;

for each one of the plurality of decision rules, computing a corresponding measure of impurity indicative of an extent to which each of the at least two subsets formed by applying the one of the plurality of decision rules contains training samples associated with different pronunciation labels, wherein the one of the plurality of decision rules, when applied to word strings in the first set of training samples, determines whether at least one selected word indicator is present in the word strings, and wherein at least one training sample in the first set of training samples is retained for computing the measure of impurity corresponding to the one of the plurality of decision rules even if the at least one selected word indicator is absent in the word string of the at least one training sample; and selecting, for the first node of the decision tree, a decision rule from the plurality of decision rules based at least in part on the measures of impurity computed for the plurality of decision rules.

18. The at least one machine readable memory of claim 17, wherein the at least one processor is further configured to apply the test to the input word string at least in part by:

at the first node of the decision tree, determining whether to proceed to the second node of the decision tree, at least in part by applying the selected decision rule to the input word string.

19. The at least one machine readable memory of claim 17, wherein the selected decision rule has a lowest measure of impurity among the plurality of decision rules.

20. The at least one machine readable memory of claim 17, wherein the measures of impurity comprise an entropy measure.

21. The at least one machine readable memory of claim 20, wherein the entropy measure comprises a Shannon entropy.

22. The at least one machine readable memory of claim 20, wherein the entropy measure comprises a Gini entropy.

23. The at least one machine readable memory of claim 17, wherein, when applied to word strings in the first set of training samples, the one of the plurality of decision rules determines an order and a distance of at least one selected word indicator relative to the homograph in each word string, wherein an absence of the at least one selected word indicator in at least one word string is treated as the at least one selected word indicator being more than a predefined distance from the homograph.

24. The at least one machine readable memory of claim 17, wherein the plurality of decision rules is a first plurality of decision rules and the selected decision rule is a first decision rule that partitions the first set of training samples into at least second and third sets of training samples, and wherein the at least one processor is further configured to construct the decision tree at least in part by:

applying a second plurality of decision rules to the second set of training samples, each of the second plurality of decision rules partitioning the second set of training samples into at least two subsets of the second set of training samples;

for each one of the second plurality of decision rules, computing a corresponding measure of impurity indicative of an extent to which each of the at least two subsets formed by applying the one of the second plurality of decision rules contains training samples associated with different pronunciation labels; and selecting, for the second node of the decision tree, a second decision rule from the second plurality of decision rules based at least in part on the measures of impurity computed for the second plurality of decision rules.

* * * * *